United States Patent
Wu et al.

(10) Patent No.: US 7,467,625 B1
(45) Date of Patent: Dec. 23, 2008

(54) FLEXIBLE FUEL IMPULSE CHARGED ENGINE ASSEMBLY

(75) Inventors: Ko-Jen Wu, Troy, MI (US); James C. Elmslie, Oxford, MI (US); Jian Jun Zhang, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/832,556

(22) Filed: Aug. 1, 2007

(51) Int. Cl.
*F02B 13/00* (2006.01)
*F02B 13/10* (2006.01)

(52) U.S. Cl. ...................................... 123/575; 123/337

(58) Field of Classification Search ................. 123/575, 123/576, 577, 578, 337, 402, 403, 184.53
See application file for complete search history.

(56) References Cited

U.S. PATENT DOCUMENTS

| 4,995,367 A * | 2/1991 | Yamauchi et al. ............ 123/494 |
| 2002/0134362 A1 * | 9/2002 | Deutsch ....................... 123/575 |
| 2006/0037570 A1 * | 2/2006 | Hitomi et al. ............ 123/90.15 |

* cited by examiner

Primary Examiner—Mahmoud Gimie

(57) ABSTRACT

The present invention provides a flexible fuel internal combustion engine utilizing impulse charging technology. The internal combustion engine includes a fuel sensor which determines the type of fuel currently being supplied to the engine, for example, either gasoline or E85. Based upon this determination, the impulse charging will be inactive (if gasoline is sensed) or active (if E85 is sensed). A speed or torque sensor is also utilized to determine if impulse charging will produce a volumetric efficiency that is better matched to the fuel octane characteristics.

15 Claims, 3 Drawing Sheets

FLEXIBLE FUEL IMPULSE CHARGED ENGINE ASSEMBLY

FIELD

The present disclosure relates to a flexible fuel, internal combustion engine and more particularly to a flexible fuel, impulse charged internal combustion engine and transmission assembly.

BACKGROUND

The statements in this section merely provide background information related to the present disclosure and may or may not constitute prior art.

The internal combustion engine, particularly with regard to passenger car and light truck applications, has been the subject of extensive and exhaustive development. One of the more recent improvements involves operation of an internal combustion engine as a flexible fuel engine, i.e., an engine operating on a variety of fuels, most commonly gasoline and E85 (a mixture of 85 percent ethanol and 15 percent gasoline). While a flexible fuel engine presently offers certain advantages from the standpoint of fuel expense and the larger issue of foreign oil dependency, there are operational issues which are the subject of much contemporary research and development.

For example, while a typical flexible fuel engine operating on E85 offers performance improvements due to the higher octane of the ethanol that allows the spark timing to be set at more favorable crank angles under heavy load conditions, these improvements are limited because the engine air flow, which is the primary power limiting factor, remains unchanged. Thus, the performance and fuel economy potential of the E85 fuel are not fully realized.

Another technology undergoing rapid development is referred to as impulse charging. Here, a rapidly operating, essentially two position impulse valve is disposed in each intake runner between the common air supply and the conventional intake valve. Generally speaking, it is disposed proximate the intake valve such that it defines a relatively short length of intake runner which is opened and closed by the impulse valve in timed relation to the operation of the intake valve.

During the first half of the intake stroke, the impulse valve is closed, creating a vacuum. When the impulse valve opens, air is rapidly drawn into the cylinder from the intake manifold. At the end of the intake stroke, the impulse valve rapidly closes to trap a maximum possible amount of air in the intake runner and cylinder downstream of the impulse valve. Air in the runner downstream of the impulse valve is compressed to higher pressures during the first part of the compression stroke while the intake valve is still open. As the intake stroke begins again, this pressurized air enhances scavenging, reduces the in-cylinder temperature and minimizes any pre-ignition tendency. An impulse charged engine typically provides improved volumetric efficiency.

Because of the new and developing nature of these technologies, improvements in flexible fuel and impulse charging technologies are both possible and desirable. The present invention relates to an improvement for an internal combustion engine utilizing these technologies.

SUMMARY

The present invention provides a flexible fuel internal combustion engine and transmission assembly utilizing impulse charging technology. The internal combustion engine includes a fuel sensor which determines the type of fuel currently being supplied to the engine, for example, either gasoline or E85. Based upon this determination, the impulse charging will be inactive (if gasoline is sensed) or active (if E85 is sensed).

Since the volumetric efficiency of an engine due to impulse charging changes with engine speed, a speed or torque sensor is also utilized to determine if impulse charging will produce a volumetric efficiency that is better matched to the fuel octane characteristics. If a determination is made that impulse charging will produce a suitable or desirable increase in volumetric efficiency, the engine controller activates an impulse charging controller which operates the impulse charging valves disposed in each of the intake runners of the engine. The fuel system of the engine may be either a port or in-cylinder direct fuel injection type.

With the increased engine torque, it is also desirable that the transmission shift and torque converter lockup schedules be adjusted to optimize vehicle performance and fuel economy.

Thus it is an object of the present invention to provide a flexible fuel internal combustion engine having adaptive impulse charging and control components.

It is a further object of the present invention to provide a flexible fuel internal combustion engine and transmission having adaptive impulse charging and control components.

It is a still further object of the present invention to provide a flexible fuel internal combustion engine having impulse charging and control components including a fuel sensor.

It is a still further object of the present invention to provide a flexible fuel internal combustion engine having impulse charging and control components which are disabled when the engine is fueled by gasoline.

Further advantages and areas of applicability will become apparent from the description provided herein. It should be understood that the description and specific examples are intended for purposes of illustration only and are not intended to limit the scope of the present disclosure.

DRAWINGS

The drawings described herein, in which like reference numbers in the several drawing Figures refer to the same component, element or feature, are for illustration purposes only and are not intended to limit the scope of the present disclosure in any way.

Figure 3:
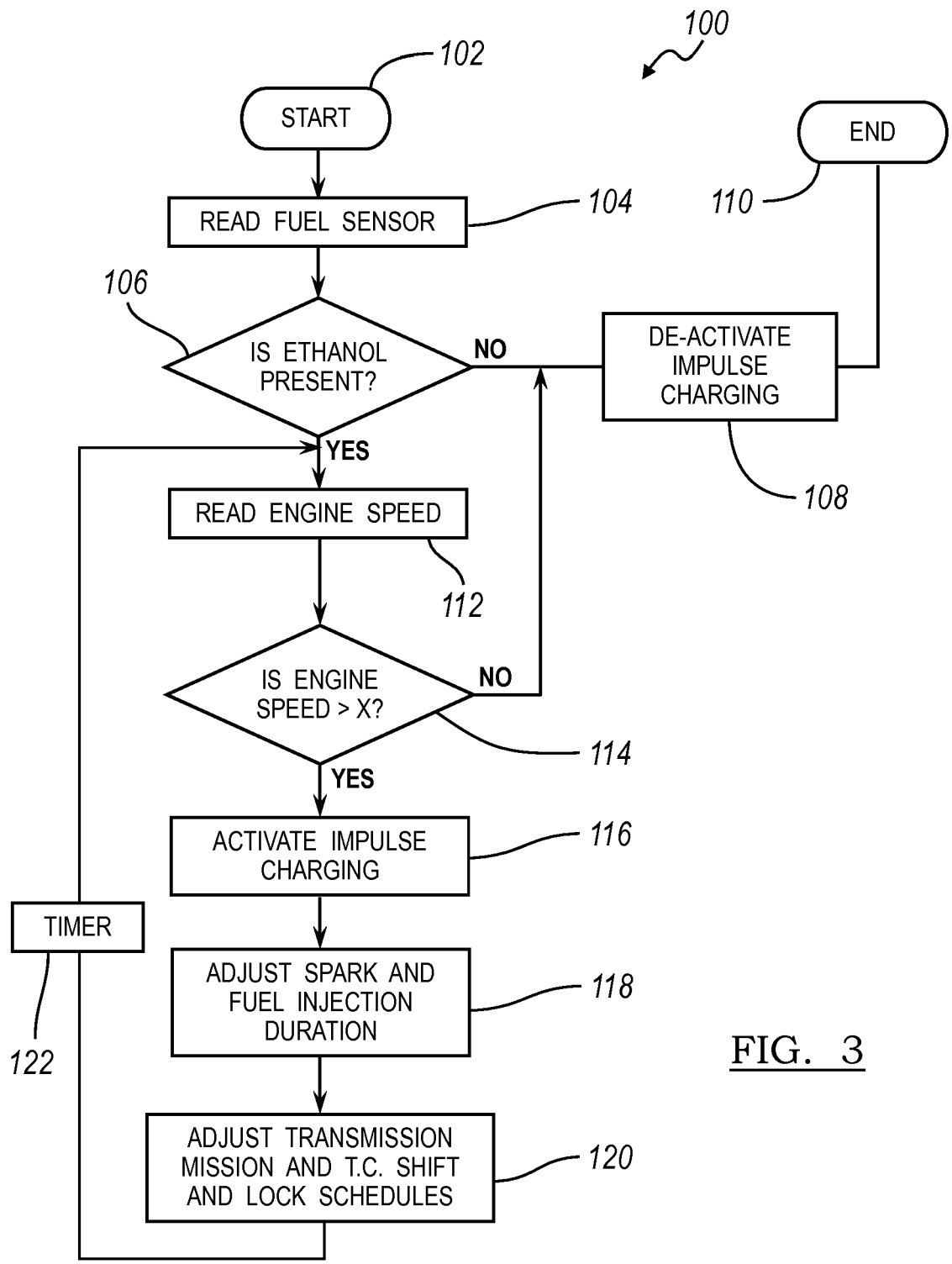
Figure 4:
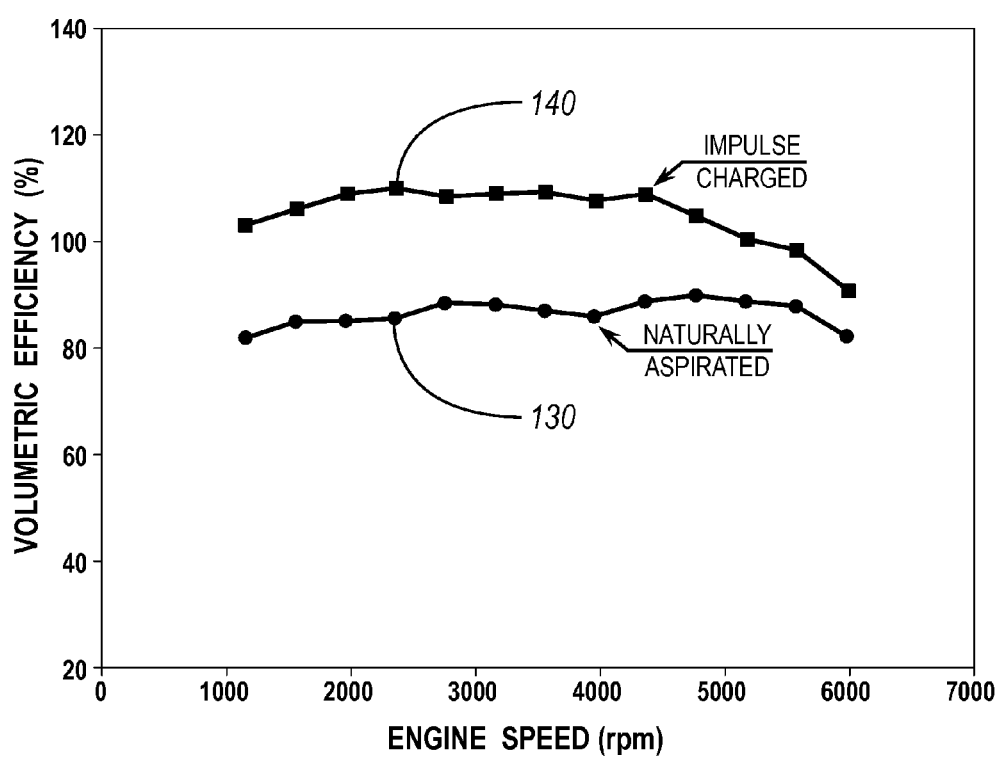

FIG. 3 is a computer or software flowchart of the logic and control steps of an engine controller of a flexible fuel, impulse charged internal combustion engine and transmission assembly according to the present invention; and FIG. 4 is a graph depicting the volumetric efficiency of a prior art flexible fuel, naturally aspirated internal combustion engine and a flexible fuel, impulse charged internal combustion engine according to the present invention.

DETAILED DESCRIPTION

The following description is merely exemplary in nature and is not intended to limit the present disclosure, application, or uses.

Figure 1:
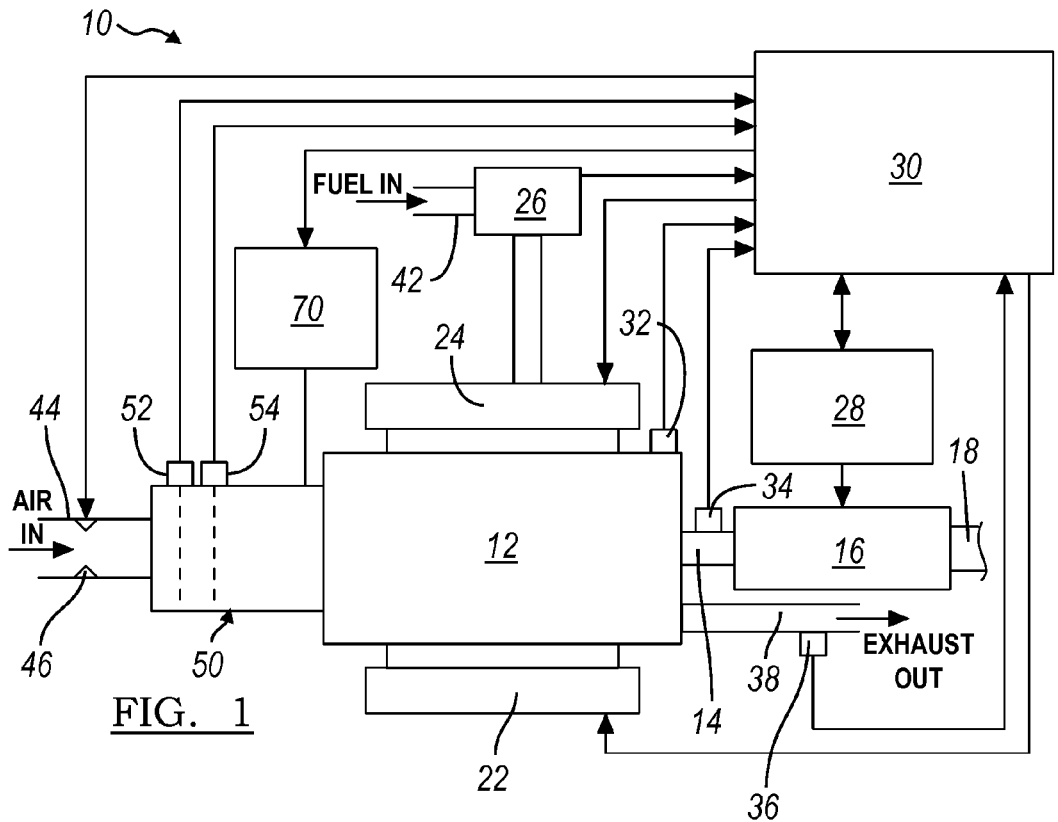
FIG. 1 is a diagrammatic illustration of a flexible fuel, impulse charged internal combustion engine and transmission assembly according to the present invention.

With reference to FIG. 1, a flexible fuel, impulse charged internal combustion engine and transmission assembly according to the present invention is illustrated and generally designated by the reference number 10. The engine and transmission assembly 10 include a multiple, typically four, six or eight piston and cylinder internal combustion engine 12 having an output shaft 14 which directly drives a multiple speed, typically automatic transmission 16 which, in turn, drives an output shaft 18. Operatively associated with the internal combustion engine 12 is an ignition system 22, a fuel injection system 24 which receives fuel from a fuel sensor 26 and a transmission controller 28 which provides control signals and reads and stores data from the automatic transmission 16. It should be appreciated that the fuel injection system 24 may be either a port type or in-cylinder, direct injection type.

An engine control module 30 (ECM) or similar electronic controller or microprocessor receives data and various operating signals from sensors and transducers associated with the internal combustion engine 12 as well as the associated motor vehicle and its operator (both not illustrated), contains various software, operating algorithms, processors, memory including look up tables and the like and provides various operating signals and data to components and assemblies of the internal combustion engine 12. Specifically, the engine control module 30 provides control signals to the ignition system 22, to the fuel injection system 24 and to the transmission controller 28. Additionally the engine control module 30 receives data from the fuel sensor 26, from a cam angle or position sensor 32, from a crankshaft speed sensor 34 and from an exhaust gas sensor 36 disposed in an exhaust pipe 38.

Fuel is provided to the fuel sensor 26 and the fuel injection system 24 of the internal combustion engine 12 through a fuel line 42. Combustion air is supplied to the internal combustion engine 12 through an air filter (not illustrated) and an air intake manifold 44 having a throttle or flow control 46 driven and adjusted by the engine control module 30. The intake manifold 44 is connected to an impulse charger manifold 50. Disposed within the impulse charger manifold 50 are a mass air flow sensor 52 and a manifold air pressure sensor 54.

Figure 2:
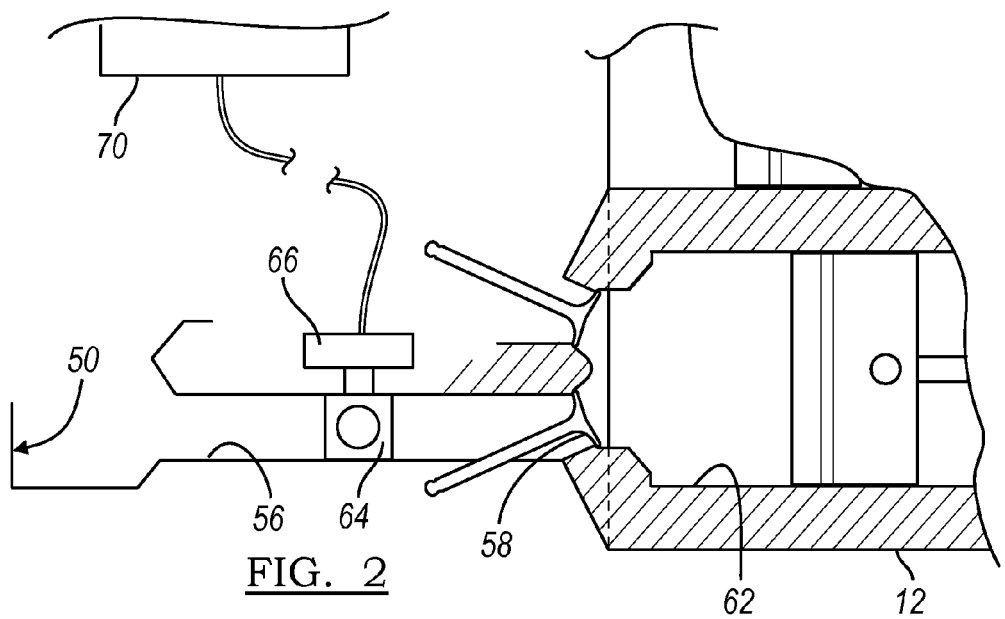
FIG. 2 is an enlarged, diagrammatic view of a portion of a flexible fuel, impulse charged internal combustion engine according to the present invention.

As illustrated in FIG. 2, the impulse charger manifold 50 includes a plurality of intake ducts or runners 56, only one of which is shown, generally equal in number to the number of cylinders in the internal combustion engine 12. The intake duct or runner 56 leads to and communicates with one (or more) inlet valves 58 associated with each of the respective cylinders 62 of the internal combustion engine 12. Disposed in each of the intake ducts or runners 56 generally proximate the inlet valve 58 is an impulse charging valve 64. The impulse charging valve 64 is preferably a two state or position rotary valve capable of rapid repositioning between open and closed. Configurations other than rotary which operate with the requisite speed are, of course, suitable and considered to be within the scope of this invention. Each of the impulse charging valves 64 is controlled by an actuator 66 which is controlled by an impulse charging controller 70. The impulse charging controller 70 is, in turn, controlled by the engine control module 30.

Referring now to FIG. 3, a flowchart or program 100 of the operation of a flexible fuel, impulse charged internal combustion engine 12 is presented. Typically, this program 100 will be contained and operate in the engine control module 30. Alternatively, however, it may reside and function in the impulse charging controller 70 if appropriate data exchange occurs between it and the engine control module 30. Operation according to the flowchart 100 begins with a start or initializing step 102 which clears undesired data and volatile registers, in accordance with conventional practice, to begin a new iteration of the program 100. The program 100 then moves to a process step 104 which reads a data signal from the fuel sensor 26 and determines the type of fuel being currently provided to the internal combustion engine 12. The program 100 then moves to a decision point 106 which inquires if there is ethanol or some other alternative constituent present in the fuel. Typically, the decision point 106 will respond YES or NO based upon a threshold or minimum value in the range of 40 to 60 percent so that minimal values such as the previously utilized 10 percent ethanol mixture will result in a NO response whereas fuel mixtures having significant ethanol or other constituent content will result in a YES response. It will be appreciated that the specific range and endpoints will vary according to application variables and performance goals. Accordingly, the foregoing values and range should be viewed as examples only.

If the decision point 106 is answered in the negative, the program 100 moves to a process step 108 which deactivates the impulse charging system by sending an appropriate signal or data transmission to the impulse charging controller 70. Such a signal will, inter alia, ensure that all the actuators 66 fully open the impulse charging valves 64 to inhibit impulse charging. The program 100 then returns to and end or exit point 110.

If the decision point 106 is answered in the affirmative, the program 100 moves to a process step 112 which reads the engine speed from the crankshaft speed sensor 34. The engine speed may by utilized in subsequent computations directly or it may be conditioned or adjusted to indicate torque by a correction based upon the speed—torque relationship of the particular internal combustion engine 12.

The program 100 then moves to a decision point 114 which inquires whether the engine speed or torque is above or below a certain threshold. If the engine speed or torque is below a certain threshold value where impulse charging would not significantly or materially improve volumetric efficiency, the decision point 114 is exited at NO and the program 100 returns to the process step 108 to deactivate impulse charging and then moves to the end point 110. If the engine speed or torque is such that impulse charging would improve volumetric efficiency, the decision point 114 is exited at YES.

Next, a series of process steps are executed. A process step 116 activates the impulse charging feature of the present invention be sending an appropriate signal to the impulse charging controller 70. Then a process step 118 sends appropriate signals to the ignition system 22 to adjust the spark timing and to the fuel injection system 24 to adjust for the additional air volume flow. Finally, a process step 120 generates commands to the transmission controller 28 to adjust the shift point schedule of the automatic transmission 16 and the lockup schedule of the torque converter to optimize vehicle performance and fuel economy. The program 100 then executes a short interval timer 122, preferably less than one second, and returns to the input of process step 112 to update the engine speed.

Referring now to FIG. 4, two sets of data points are presented which graphically illustrate the improvement in volumetric efficiency possible through the use of impulse charging with an alternative fuel such as E85 in a flexible fuel internal combustion engine. A first set of data points, labeled 130, presents operation of a naturally aspirated internal combustion engine at various speeds and its corresponding volumetric efficiency. A second set of data points, labeled 140, presents operation of an impulse charged engine at various speeds and its corresponding volumetric efficiency. Note that, on average, the volumetric efficiency of an impulse charged engine operating between about r.p.m. and 4000 r.p.m. is approximately 20 percent higher than that of a naturally aspirated engine.

The foregoing description of the invention is merely exemplary in nature and variations that do not depart from the gist of the invention are intended to be within the scope of the invention. Such variations are not to be regarded as a departure from the spirit and scope of the invention.

What is claimed is:

1. A flexible fuel, impulse charged internal combustion engine comprising, in combination,
   a piston reciprocably received in a cylinder,
   an inlet valve providing communication with said cylinder,
   an inlet runner providing inlet air to said inlet valve,
   an impulse charging valve disposed in said inlet runner,
   a crankshaft speed sensor adapted to detect engine speed and produce an engine speed signal,
   a fuel sensor adapted to detect an alternative fuel type and produce a fuel type signal, and
   a control module receiving said fuel type signal and said engine speed signal wherein the control module activates the impulse charging valve based on the received fuel type signal and engine speed signal.

2. The flexible fuel impulse charged engine of claim 1 wherein said impulse charging valve is a rotary valve.

3. The flexible fuel impulse charged engine of claim 1 further including a mass air flow sensor.

4. The flexible fuel impulse charged engine of claim 1 wherein said impulse charging valve is proximate said inlet valve.

5. The flexible fuel impulse charged engine of claim 1 wherein said engine includes an equal number of said pistons, said inlet valves and said charging valves.

6. The flexible fuel, impulse charged internal combustion engine of claim 1 wherein the engine control module includes a program code which has a first program step to receive a data signal from the fuel type sensor, a second program step to determine if an alternative constituent is present in the fuel, a third program step to deactivate the impulse charging valve if the alternative constituent is not present in the fuel, a fourth program step to receive a data signal from the crankshaft speed sensor, a fifth program step to determine if the engine speed is above a threshold, a sixth program step to deactivate the impulse charging valve if the engine speed is below the threshold, and a seventh program step to send a plurality of signals to activate the impulse charging valve, adjust spark timing, adjust fuel injection, and adjust a automatic transmission shift point schedule if the engine speed is above the threshold.

7. A flexible fuel, impulse charged internal combustion engine comprising, in combination,
   a fuel sensor adapted to detect an alternative fuel and produce a fuel signal,
   at least one piston and cylinder assembly having at least one intake valve and at least one exhaust valve,
   an air intake runner for providing air to said at least one intake valve,
   an impulse charging valve disposed in said intake runner having an actuator for opening and closing said valve,
   a crankshaft speed sensor adapted to detect engine speed and produce an engine speed signal,
   an electronic control module receiving said fuel signal and said engine speed signal, and wherein the control module activates the impulse charging valve based on the received fuel type signal and the engine speed signal when the engine speed signal is indicative of an engine speed that is greater than a threshold.

8. The flexible fuel, impulse charged internal combustion engine of claim 7 wherein said electronic control module computes engine torque from engine speed data from said crankshaft speed sensor.

9. The flexible fuel, impulse charged internal combustion engine of claim 7 wherein said impulse charging valve is disposed adjacent said intake valve.

10. The flexible fuel, impulse charged internal combustion engine of claim 7 wherein said type of fuel sensed is ethanol.

11. The flexible fuel, impulse charged internal combustion engine of claim 7 further including a mass air flow sensor for providing data to said electronic control module.

12. The flexible fuel, impulse charged internal combustion engine of claim 7 wherein said impulse charging valve is a rotary valve.

13. The flexible fuel, impulse charged internal combustion engine of claim 7 wherein said engine includes an equal number of said piston and cylinder assemblies and said charging valves.

14. The flexible fuel, impulse charged internal combustion engine of claim 7 wherein said fuel type sensor is capable of providing data facilitating determination of at least gasoline and ethanol.

15. The flexible fuel, impulse charged internal combustion engine of claim 7 wherein the engine control module includes a program code which has a first program step to receive a data signal from the fuel type sensor, a second program step to determine if an alternative constituent is present in the fuel, a third program step to deactivate the impulse charging valve if the alternative constituent is not present in the fuel, a fourth program step to receive a data signal from the crankshaft speed sensor, a fifth program step to determine if the engine speed is above the threshold, a sixth program step to deactivate the impulse charging valve if the engine speed is below the threshold, and a seventh program step to send a plurality of signals to activate the impulse charging valve, adjust spark timing, adjust fuel injection, and adjust a automatic transmission shift point schedule if the engine speed is above the threshold.

* * * * *